W. SYKES.
CONTROL SYSTEM FOR ELECTRIC MOTORS.
APPLICATION FILED JAN. 10, 1912.

1,196,172.

Patented Aug. 29, 1916.
3 SHEETS—SHEET 1.

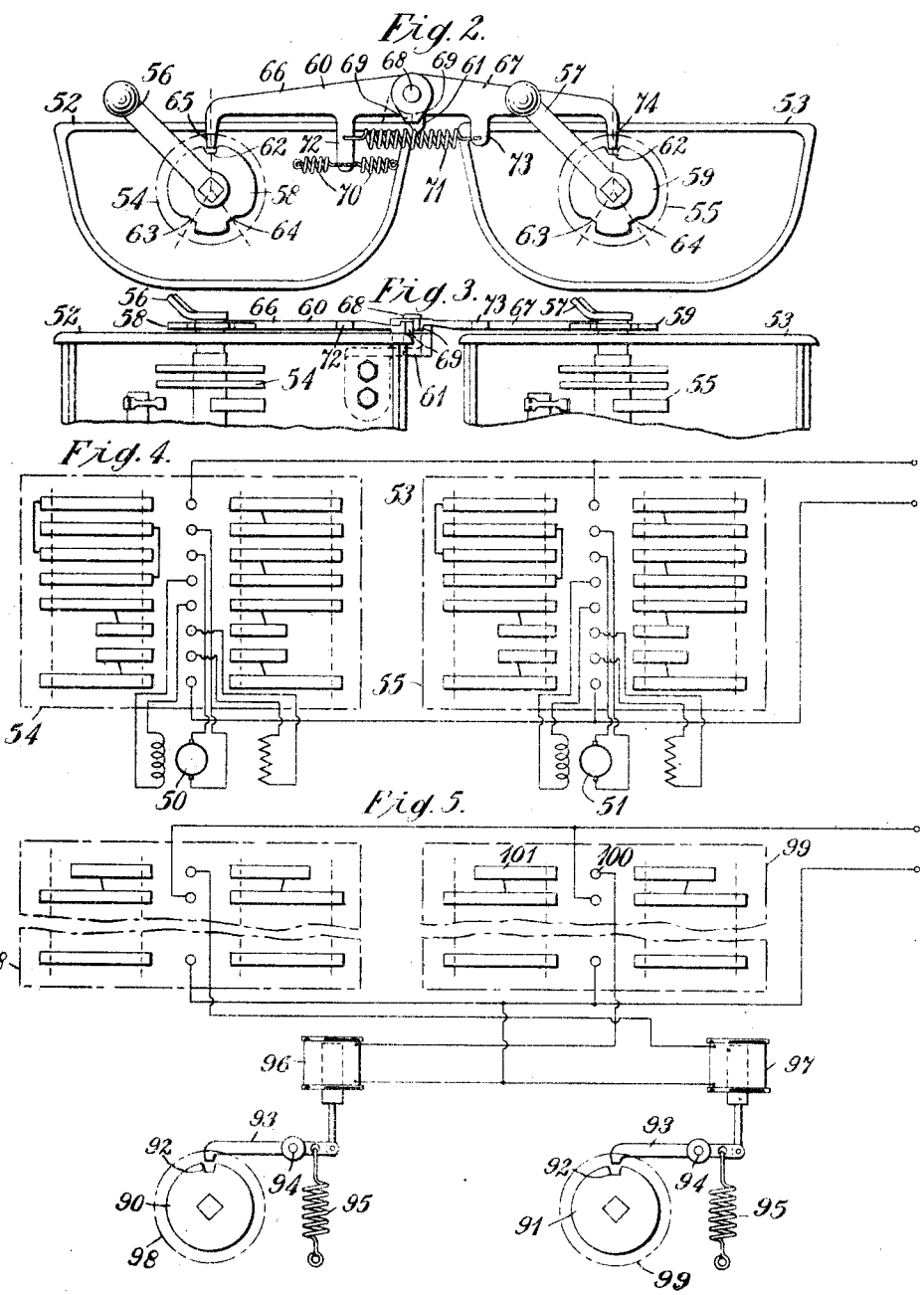

W. SYKES.
CONTROL SYSTEM FOR ELECTRIC MOTORS.
APPLICATION FILED JAN. 10, 1912.

1,196,172.

Patented Aug. 29, 1916.
3 SHEETS—SHEET 3.

WITNESSES:
Fred H Miller

INVENTOR
Wilfred Sykes
BY
ATTORNEY

UNITED STATES PATENT OFFICE.

WILFRED SYKES, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,196,172.     Specification of Letters Patent.     Patented Aug. 29, 1916.

Application filed January 10, 1912. Serial No. 670,527.

*To all whom it may concern:*

Be it known that I, WILFRED SYKES, a subject of the King of Great Britain, and a resident of Pittsburgh, in the county of Allegheny and State of Pennsylvania, have invented a new and useful Improvement in Control Systems for Electric Motors, of which the following is a specification.

My invention relates to control systems of electric motors and it has special reference to such systems as are adapted to govern the operation of electric hoist motors.

The object of my invention is to provide simple and automatic means for preventing the concurrent acceleration of two motors which are utilized in systems of the class above indicated, without interfering with the independent or simultaneous operation of both motors after one of them has attained full operating speed or some other predetermined operating condition.

Electric motors are quite largely used in the operation of hoists and ore bridges in which the motors which operate both the trolley and the hoist are frequently stopped, started and operated in the reverse direction. A single operator governs both the trolley and hoist motors and the motors are frequently in operation at the same time. For exampple: The trolley motor may be started to convey the load, while the hoist motor is operating to raise the bucket. Where very large capacity ore bridges or similar devices are operated by power transmitted from a greater or less distance to the field of operation, and purchased from a power company which bases its charges upon the total power consumed and also upon the maximum load during predetermined periods; it is particularly desirable to keep the maximum loads as near to the average load as possible.

It has been my aim to assist in maintaining average load conditions by rendering it impossible for both the trolley and the hoist motors of an ore bridge or hoist apparatus to be accelerated at the same time. In other words, I avoid superposing the peak produced by the acceleration of one of the motors on the peak produced by the acceleration of the other.

Figure 1:
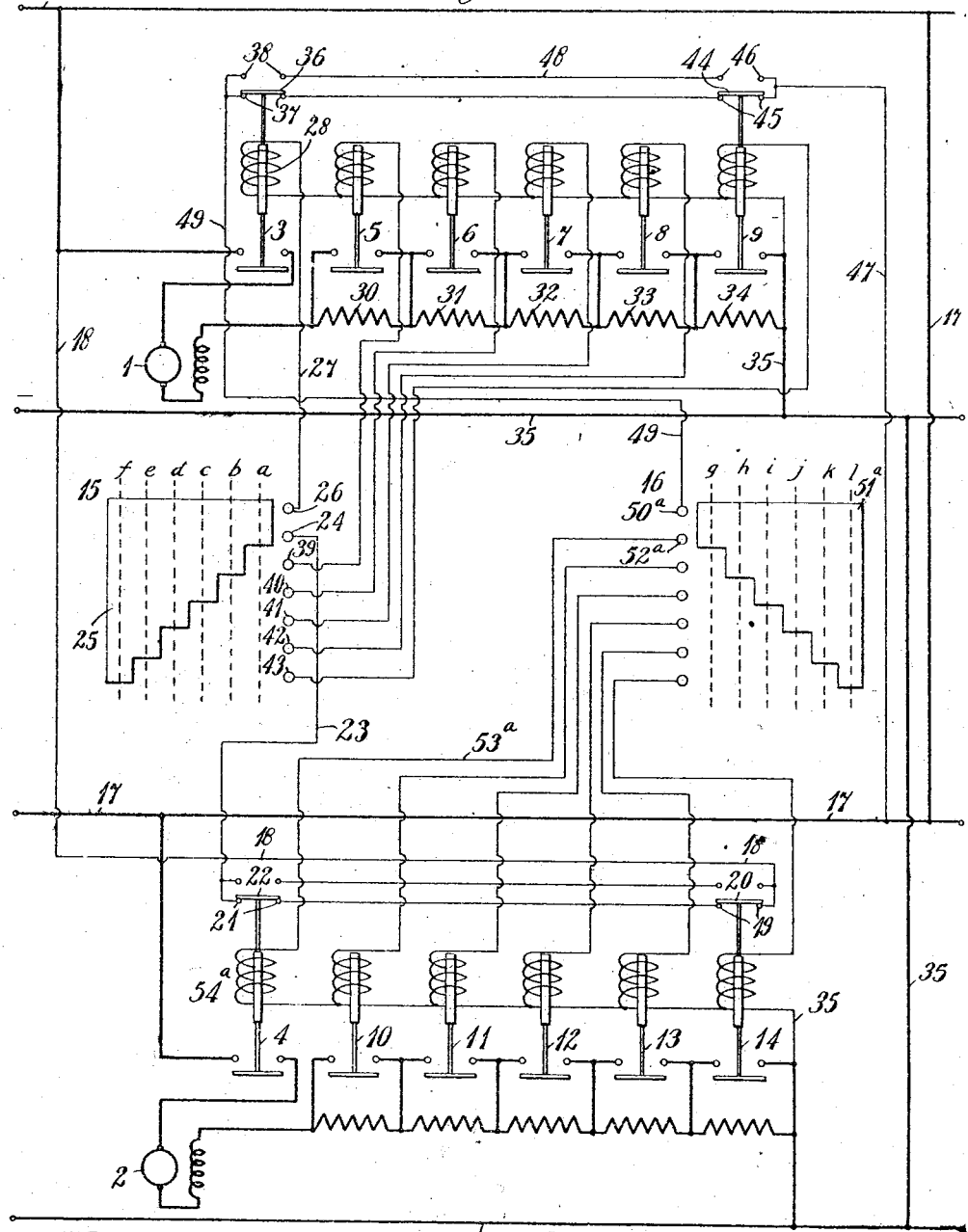
Figure 6:
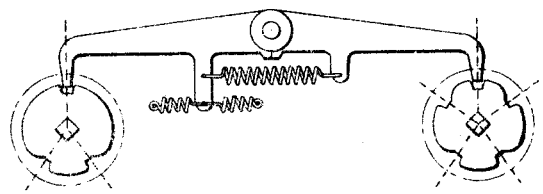
Figure 7:
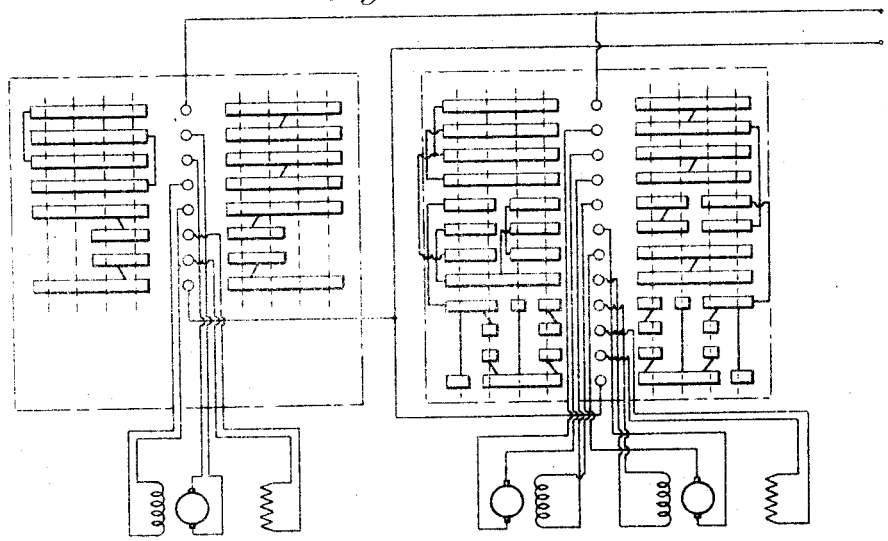

Figure 1 of the accompanying drawings is a diagram of a control system comprising a plurality of independently operated switches embodying my invention. Figs. 2 and 3 are respectively a top view and a partial front elevation, and Fig. 4 is a diagram showing the circuit connections of a modified arrangement of control which also embodies my invention. Fig. 5 is a view, corresponding to Fig. 4, of still another modification of my invention, and Figs. 6 and 7 are views, corresponding respectively to Figs. 2 and 4, of still another modification of my invention.

Referring to Fig. 1 of the drawings, the system here shown comprises an electric motor 1 which may be designated as a hoist motor, an electric motor 2 which may be designated as a trolley motor, line switches 3 and 4 and a plurality of independently operating accelerating switches 5 to 9, inclusive, and 10 to 14, inclusive, for the respective motors. The line switch and the accelerating switches of motor 1 are governed by a master switch 15 which is adapted to occupy positions *a, b, c, d, e* and *f*, and the switches which control the motor 2 are governed by a master switch 16 which is adapted to occupy positions *g, h, i, j, k* and *l*.

The operation and the circuit connections of the system are as follows: Assuming that the master switch and the control switches occupy the positions shown in the drawings, if master switch 15 is moved to position *a*, circuit is completed from any suitable source of energy (not shown), through line conductor 17, conductor 18, contact members 19, which are bridged by contact member 20 when switch 14 is open, contact members 21, which are bridged by contact member 22 when switch 4 is open, conductor 23, contact finger 24 of master switch 15, contact member 25, contact finger 26, conductor 27 and coil 28 of switch 3 to negative line conductor 35. Line switch 3 is thus closed, completing a motor circuit from conductor 17, through switch 3, armature and field magnet windings of motor 1 and resistor sections 30 to 34, inclusive, to negative line conductor 35. As switch 3 is closed, contact member 36 is moved out of engagement with contact members 37 into engagement with contact members 38. Consequently, it is impossible to supply energy through the master switch 16 to the line switch 4 and the control switches 10 and 14. As the master switch 15 successively occupies positions *b* to *f*, inclusive, contact fingers 39 to 43, inclusive are successively brought into contact with the member 25 and the switches 5 to 9, inclusive, are successively closed. By this means, the resistor sections 30 to 34, inclusive, are short circuited in the order named, and the motor 1 is accelerated. When the switch 9 is closed, the contact member 44 moves out of engagement with contact members 45 and into engagement with contact members 46.

If the master switch 16 be moved into position g, a circuit will be established from conductor 17, through conductor 47, contact members 46, conductor 48, contact members 38, conductor 49, contact finger 50ª, contact member 51ª, contact finger 52ª and conductor 53ª to coil 54ª of line switch 4, circuit being completed through negative conductor 35. The line switch 4 is thus closed and the circuit of motor 2 completed, corresponding to the circuit of the motor 1 when line switch 3 is closed. The motor 2 is similarly accelerated by adjusting the master switch 16 to occupy successively positions h to l, inclusive.

If the master switch 15 should be returned to its off position during acceleration of the motor 2, it would then be impossible to supply current to the line switch 3 and to restart the motor 1 until the motor 2 had substantially acquired full speed.

While I have shown a simple control system in which each control switch is dependent directly upon the master switch, my invention may, and probably will, be used in connection with systems in which the acceleration of the motors is automatically effected.

Referring to Figs. 2, 3 and 4 of the drawings, the motors 50 and 51, which correspond to the motors 1 and 2 of Fig. 1, are governed directly by controllers 52 and 53. The controllers are respectively provided with control drums 54 and 55, in the usual manner, and operating handles 56 and 57. In addition to these parts, they are provided with similar cams or notched plates 58 and 59 and an interlocking lever 60 which is pivotally secured to a bracket 61 of the controller 52 and is centered by springs 70. Each of the cams 58 and 59 is provided with notches 62, 63 and 64, the notch 62 of the cam 58 being opposite a projection 65 of the lever 60 when the controller with which the cam is associated occupies its off position and the notches 63 and 64 being brought opposite the projection 65 when the controller respectively occupies its full forward and full reverse positions. The lever 60 comprises two lever arms 66 and 67 which are pivotally mounted on a projection 68 of the bracket 61 and are provided with coöperating projections 69 which constitute stops and limit the relative rotation of the arms in one direction. The arms are caused to act as a single lever under normal conditions by reason of a spring 71 which is interposed between projections 72 and 73 and holds the stops 69 in engagement with each other.

The operation of the controllers and the interlocking mechanism is as follows: Assuming that both controllers occupy their off positions, as shown in Fig. 2 of the drawings, and that the interlocking lever 60 occupies its mid position, if the control lever 56 of controller 52 is moved to produce a clockwise rotation of the controller drum and the cam 58, the lever 60 will be shifted as a whole so as to throw projection 65 into the bottom of notch 62 in cam 59, thereby locking the drum of controller 53 against rotation. The lever is held in this position until controller 52 occupies either its full forward or its full reverse position. When either one of these positions is occupied by the controller, the projection 65 is opposite either notch 63 or notch 64 in the cam 58 and, consequently, the lever 60 may be readily centered by the spring 70 and the drum of controller 53 may be freely released. If, during the time when controller 52 is being adjusted, it be desired to throw the controller 53 out of its off position, the projection 65 will not clear the notched surface of the cam 58 and will rotate the arm 66 in opposition to the spring 71 sufficiently to permit the drum 55 to be returned to its off position. Unless this position has been reached, however, it will be impossible to again adjust the drum of controller 52 until the controller 53 occupies either its off or one of its full running positions. Conversely, if the controller 53 were adjusted, the controller 52 will be locked in its off position. The arrangement of parts is such that if both controllers occupy their off positions, either of them may be moved out of the off position and adjusted to accelerate the motor with which it is associated, but as soon as it is so moved it then becomes impossible to adjust the drum of the other controller by reason of the fact that it is then impossible for the lever 60 to release the other drum until the drum in operation reaches its full forward or its full reverse position. When either of these positions is reached, the other controller may be adjusted in the usual manner, since the projection 65 of the lever may engage one of the notches 63 and 64.

Referring to Fig. 5 of the drawings, the system here shown corresponds to that of Figs. 2, 3 and 4, except that the mechanical interlock composed of the lever 60 and the cams 58 and 59 is replaced by cams 90 and 91, each of which is provided with a single notch 92 which may be engaged by a lever 93 when the controller with which it is associated occupies its off position. Each of the levers 93 is pivotally supported at points 94 and is provided with springs 95, or other suitable means for holding the lever out of engagement with the surface of the cam. The levers are provided with electromagnets 96 and 97 which are adapted to respectively oppose the springs 95 and to move the levers into engagement with the cam surface. The electromagnet 96, which is associated with the cam 90 and the control drum 98, is energized so long as drum 99 of the other controller occupies any of its intermediate positions by reason of the engagement of contact finger 100 with a contact member 101. The magnet 97 is similarly energized when the control drum 98 occupies any of its intermediate positions. Consequently, it is impossible to move one of the controllers out of its off position while the other controller is operating to accelerate its motor, or but as soon as its full forward or full reverse position is reached, the other controller may be freely operated.

It is evident that, by a slight adaptation of the systems of Figs. 1 to 5, the same result will be obtained when one of the motors is governed by a drum controller and the other is governed by independently operated switches. In this case, the locking magnet of the drum will be energized except when the first and last switches of the other system are either both open or both closed, and the drum will carry contacts corresponding to contacts 20 and 22 of Fig. 1.

Referring to Figs. 6 and 7 of the drawings, which correspond to Figs. 2 and 4, except that one of the controllers is adapted to govern two motors which are arranged for series parallel control instead of a single motor, the interlocking mechanism in this case is so arranged that the single-motor controller may be moved out of its off position provided the two-motor controller occupies either its off, its series forward or its full multiple forward position, or its series reverse or its full parallel reverse position. The two-motor controller can only be moved out of its off position when the single-motor controller occupies either its off or one of its full running positions. By this arrangement, it is possible to operate the two motors in series for a considerable period of time and to accelerate the single motor while the two motors are so operating.

It will, of course, be readily understood that two controllers, both of which are adapted to control two motors may be associated in the same way within the spirit and scope of my invention and that various modifications in the structural arrangement and circuit connections illustrated may be effected.

I claim as my invention:

1. In a control system, the combination with a plurality of motors, controlling means for each motor and means for preventing the starting of the other motors during the acceleration of any one of the motors.

2. In a control system, the combination with two electric motors, a controller for each motor and interlocking means between the controllers for preventing the starting of either motor when the other motor is being accelerated.

3. In a control system, the combination with two electric motors, a controller for each motor adapted to occupy a plurality of accelerating positions, an off position and a full running position, of means for preventing the adjustment of one of the controllers while the other controller occupies its accelerating position.

4. In a control system, the combination with two electric motors, a plurality of independently operated control switches for each motor and means for governing the switches of each motor, of means for preventing closing of one set of switches to accelerate one of the motors during the acceleration of the other motor.

5. In a control system, the combination with a pair of electric motors, two groups of independently operated switches adapted to close in a predetermined sequence and to accelerate the respective motors, of means for preventing the acceleration of one motor except when the first and last switches of the control switches of the other motor occupy corresponding positions.

6. In a control system, the combination with a pair of electric motors, two groups of independently operated switches adapted to close in a predetermined sequence and to accelerate the respective motors, of means for preventing the acceleration of one motor except when the first and last switches of the control switches of the other motor are either both open or both closed.

7. In a control system, the combination with a plurality of motors, of controlling means for each motor, and means operative only during the starting of one of said motors for preventing the starting of the other motors during the acceleration of said motor.

8. In a control system, the combination with two electric motors, of a controller for each motor, and interlocking means between said controllers, operative only during the starting of either of said motors, for preventing the starting of either motor when the other motor is being accelerated.

9. In a motor control system, the combination with a plurality of controllers, each of said controllers having a rotatable member provided with recesses, of a pivoted member having means for engaging said recesses and so arranged that each of said controllers is retained in its off position until the other controller has been rotated to a predetermined operative position.

10. In a motor control system, the combination with a plurality of controllers having an off position, each of said controllers having a rotatable member provided with engaging portions, of means for preventing rotation of each of said controllers from its off position until the other controller has been rotated to a predetermined operative position, said means comprising a pivotally mounted lever having portions for coacting with the engaging portions of said rotatable members.

In testimony whereof, I have hereunto subscribed my name this 29th day of Dec. 1911.

WILFRED SYKES.

Witnesses:
R. J. DEARBORN,
B. B. HINES.